J. R. SOUSA.
LAUNDRY DISTRIBUTING MACHINE.
APPLICATION FILED OCT. 31, 1919.

1,389,278.

Patented Aug. 30, 1921.
9 SHEETS—SHEET 1.

Witnesses
L. B. James

Inventor
John R. Sousa
By Victor J. Evans
Attorney

J. R. SOUSA.
LAUNDRY DISTRIBUTING MACHINE.
APPLICATION FILED OCT. 31, 1919.

1,389,278.

Patented Aug. 30, 1921.
9 SHEETS—SHEET 2.

Witnesses
L. B. James

Inventor
John R. Sousa
By Victor J. Evans
Attorney

J. R. SOUSA.
LAUNDRY DISTRIBUTING MACHINE.
APPLICATION FILED OCT. 31, 1919.

1,389,278.

Patented Aug. 30, 1921.
9 SHEETS—SHEET 9.

Witnesses
L. B. James

Inventor
John R. Sousa
By Victor J. Evans
Attorney

UNITED STATES PATENT OFFICE.

JOHN R. SOUSA, OF OAKLAND, CALIFORNIA.

LAUNDRY-DISTRIBUTING MACHINE.

1,389,278.  Specification of Letters Patent.   Patented Aug. 30, 1921.

Application filed October 31, 1919. Serial No. 334,675.

*To all whom it may concern:*

Be it known that I, JOHN R. SOUSA, a citizen of the United States, residing at Oakland, in the county of Alameda and State of California, have invented new and useful Improvements in Laundry-Distributing Machines, of which the following is a specification.

This invention relates to distributing machines for distributing laundry and other articles and the principal object of the invention is to provide conveyer means for conveying the articles from a central point to a plurality of receiving points and key operated means for releasing the articles from the conveyer means at any desired receiving point.

Another object of the invention is to provide automatic means for returning the conveyer to its starting point after the articles have been taken therefrom at the receiving point.

A further object of the invention is to provide means for gradually increasing the size of the receptacles at the receiving points as the articles are placed therein so that said articles will drop but a slight distance as they pass from the conveyer to the receptacle and will thus be kept in proper shape.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 8 is a perspective view of a portion of one end of the apparatus.

Fig. 18 is a view of one of the latching arms for the rake member.

Figure 13:
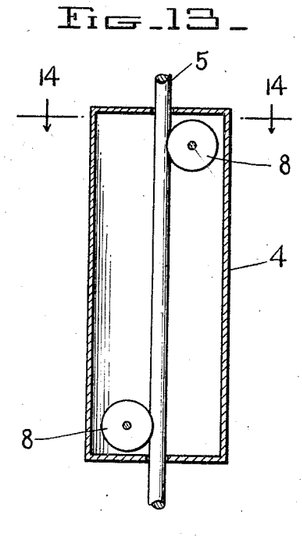
Fig. 13 is a sectional view of this guiding member.
Figure 14:
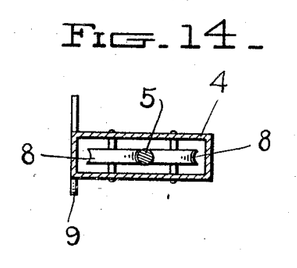
Fig. 14 is a section on line 14—14 of Fig. 13.
Figure 15:
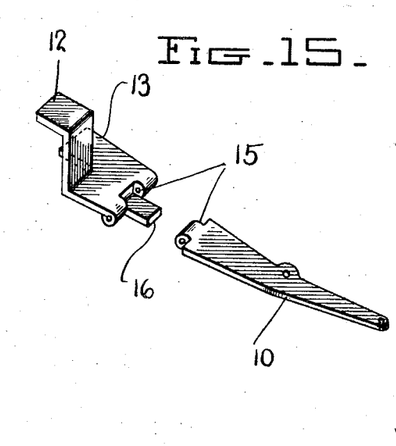
Fig. 15 is a view showing the two parts of the controlling device or dog for the said member.
Figure 16:
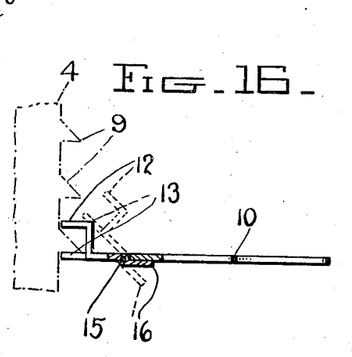
Figure 19:
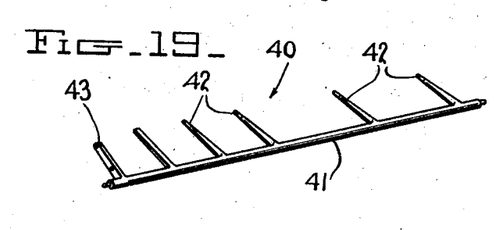
Fig. 19 is a view of one of these rake members.

The drawings show the apparatus as consisting of two sections A and B but it will of course be understood that any desired number of sections may be used. Each section is of substantially rectangular shape with its front open. The two sections have their inner sides connected together by the keyboard C. Extending inwardly from the inner walls of each section are the vertical partitions 1, which form a plurality of receiving compartments D. These compartments are arranged in horizontal rows one above the other upon the side and end walls of the section. The partitions 1 have their ends projecting through slots formed in the walls of the sections with their ends 1' projecting slightly beyond the exterior walls of the sections. Each compartment is provided with a vertically movable bottom 2 which is connected by the angle arm 3 with the guiding member or casing 4. Each of these casings is slidably mounted on the rod 5 which is carried by the brackets 6, connected with the exterior walls of the section. The sections are provided with slots 7 through which the angle arms 3 pass. Rollers 8 are located within the guiding casings 4 and these rollers engage the rods 5 as shown in Fig. 13. Each of the guide casings is provided with the rack teeth 9 which are engaged by the dog 10 which is pivotally mounted on the projecting end 1' of the partition. Each dog is provided with the upper tooth 12 and a lower tooth 13 and the dog is kept with its lower tooth in engagement with the rack by means of the spring 14. I prefer to form the dog of two parts with the part carrying the teeth hinged to the pivoted part, as shown at 15, in Fig. 15. The toothed part is provided with a projection 16 for limiting the downward movement of the said toothed part. In this way the guiding member and the bottom may be slid upwardly by hand without the dog interfering as the hinged part of the dog will simply swing upwardly and permit the teeth to pass but the downward movement of said guiding member will be given a step by step movement by the dog as the same is operated by means hereinafter described.

Above each row of receiving compartments is located a channel-shaped track 17 having a centrally located slot 18 therein. This track has its corners rounded as at 19. An endless cable 20 is placed above the slot in said track and said cable is supported at the front of the section by the rollers 21 and at the corners of the track by the rollers 22, which are carried by the spring arms 23. The cables are driven from the main shaft 24 by means of the connecting cables 25 which connect said main shaft with the shafts 26 on which the pulleys for driving the cables are mounted. It will be understood that one of these endless cables is placed at each track and it is arranged in such manner that its lower stretch will be moving in one direction while its upper stretch is moving in the opposite direction and I utilize these two stretches to cause the carriage to travel in both directions on the track.

I provide a carriage for each track and this carriage consists of a base 27 to which the L-shaped supporting fingers 28 are connected. This base has an end part 29 which carries the cam 30. Upon the upper face of the base are pivotally mounted the roller carrying arms 31, which have their inner ends of U-shape and the upper limb of each U having an offset loop 32 in which is journaled a roller 33. The arms are normally held in parallel position by the springs 34. The base of the carriage is placed under the track with the cross-pieces of the U-shaped arms passing through slot 18 in the track and with the rollers engaging the bottom of the channel. In this way the carriage is supported by the track with the base and fingers below the same.

Figure 1:
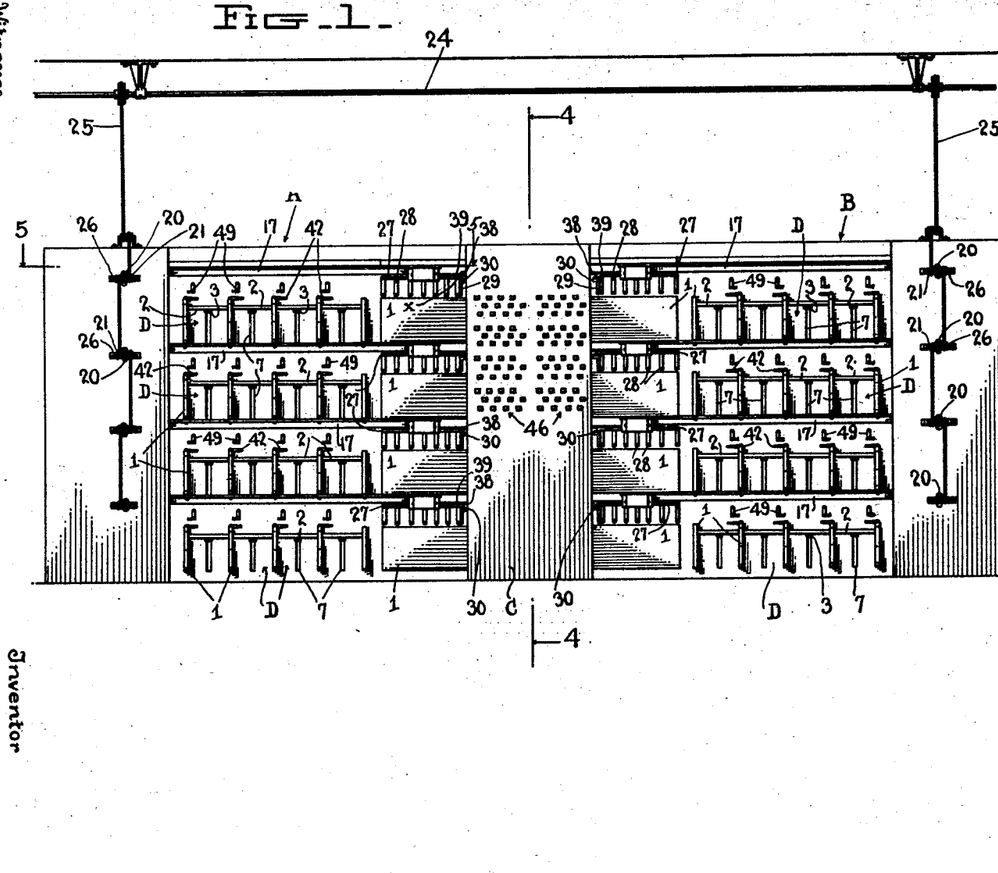
Figure 1 is a front view of an apparatus constructed in accordance with my invention and provided with two sections.
Figure 2:
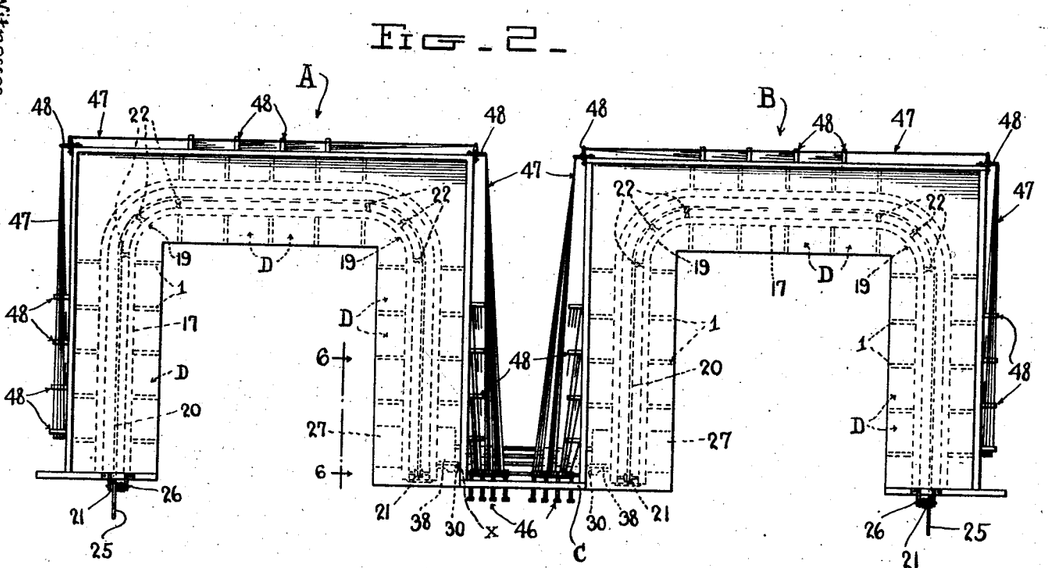
Fig. 2 is a plan view.
Figure 3:
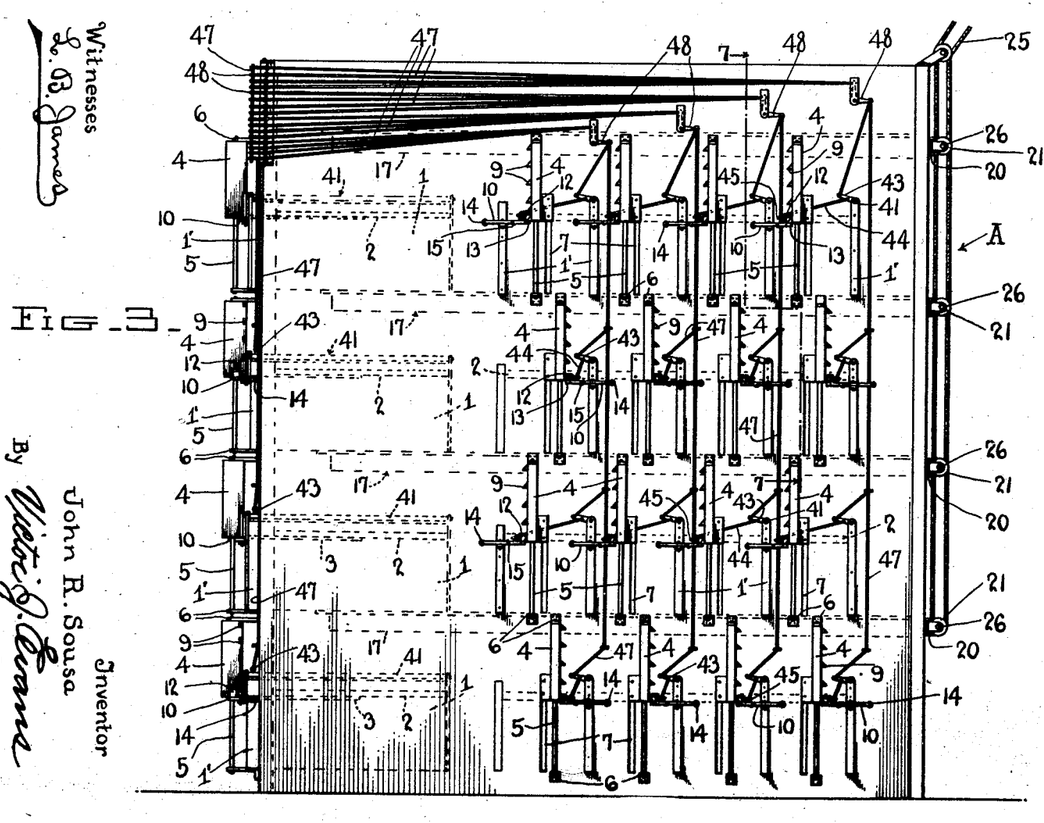
Fig. 3 is an elevation looking toward one end of the device.
Figure 4:
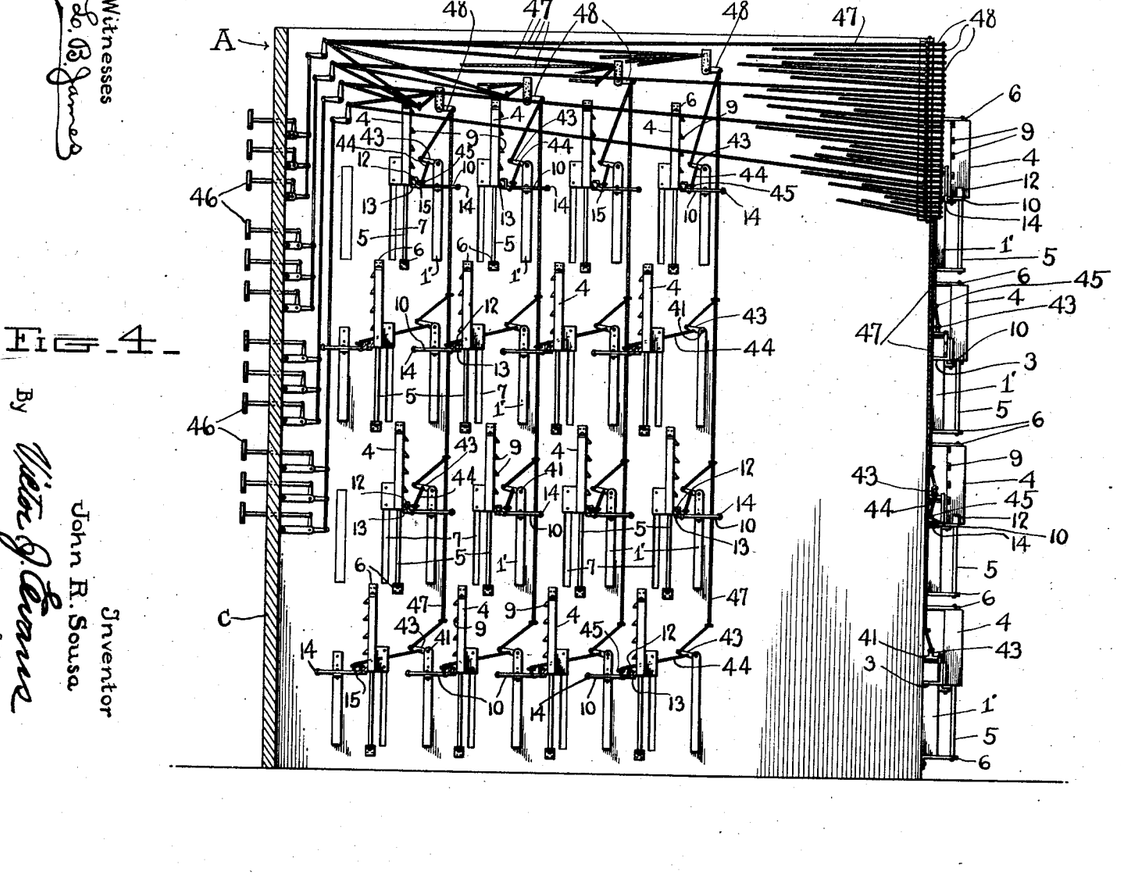
Fig. 4 is a vertical section on line 4—4 of Fig. 1.
Figure 5:
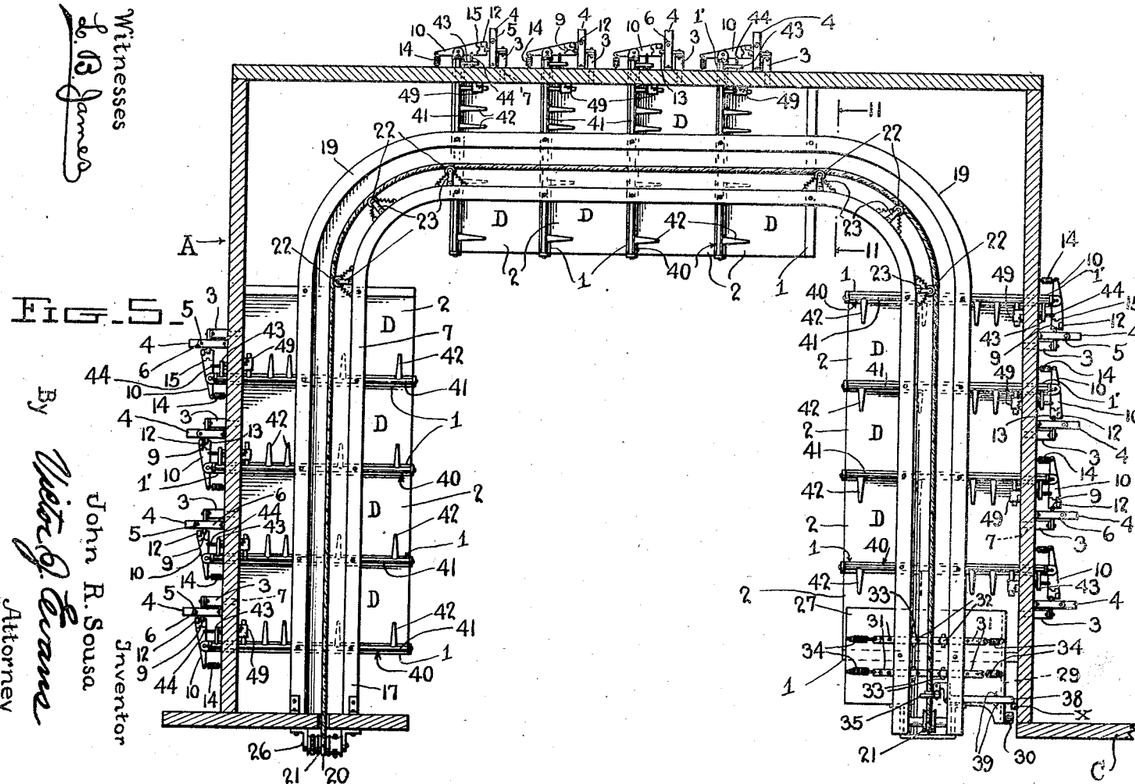
Fig. 5 is a horizontal section on line 5—5 of Fig. 1.
Figure 6:
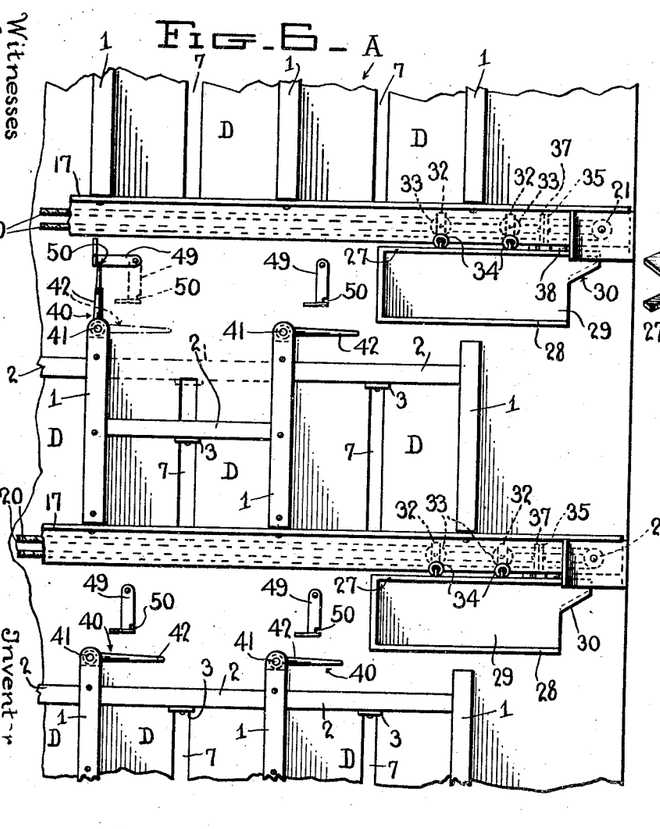
Fig. 6 is a fragmentary elevation view looking in the direction of the arrows 6—6 of Fig. 2.
Figure 7:
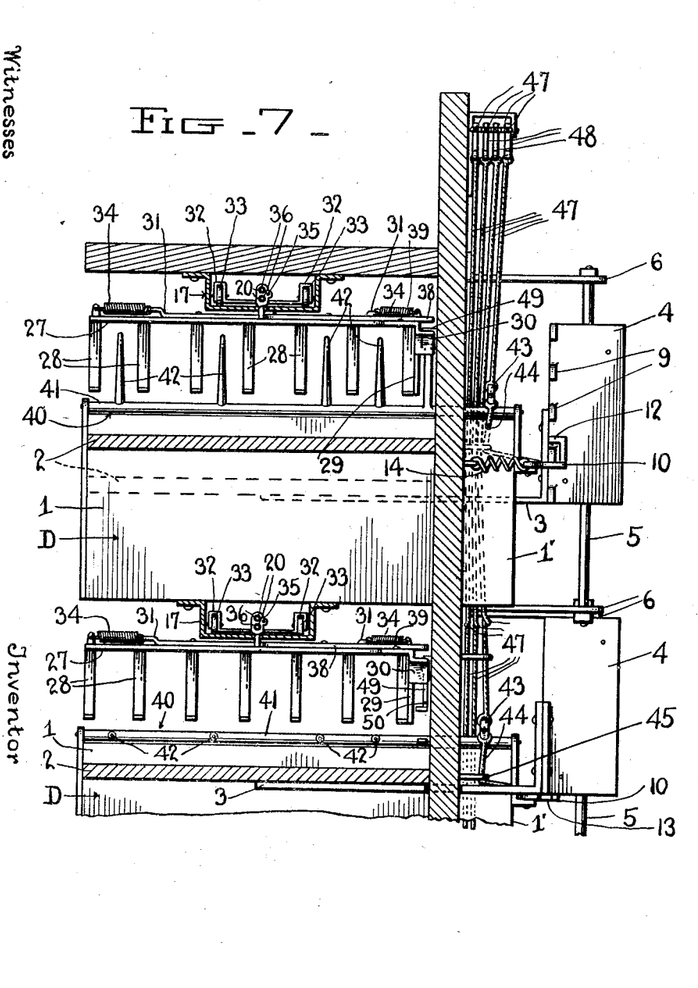
Fig. 7 is a horizontal section on line 7—7 of Fig. 3.
Figures 9, 11, 12, 17:
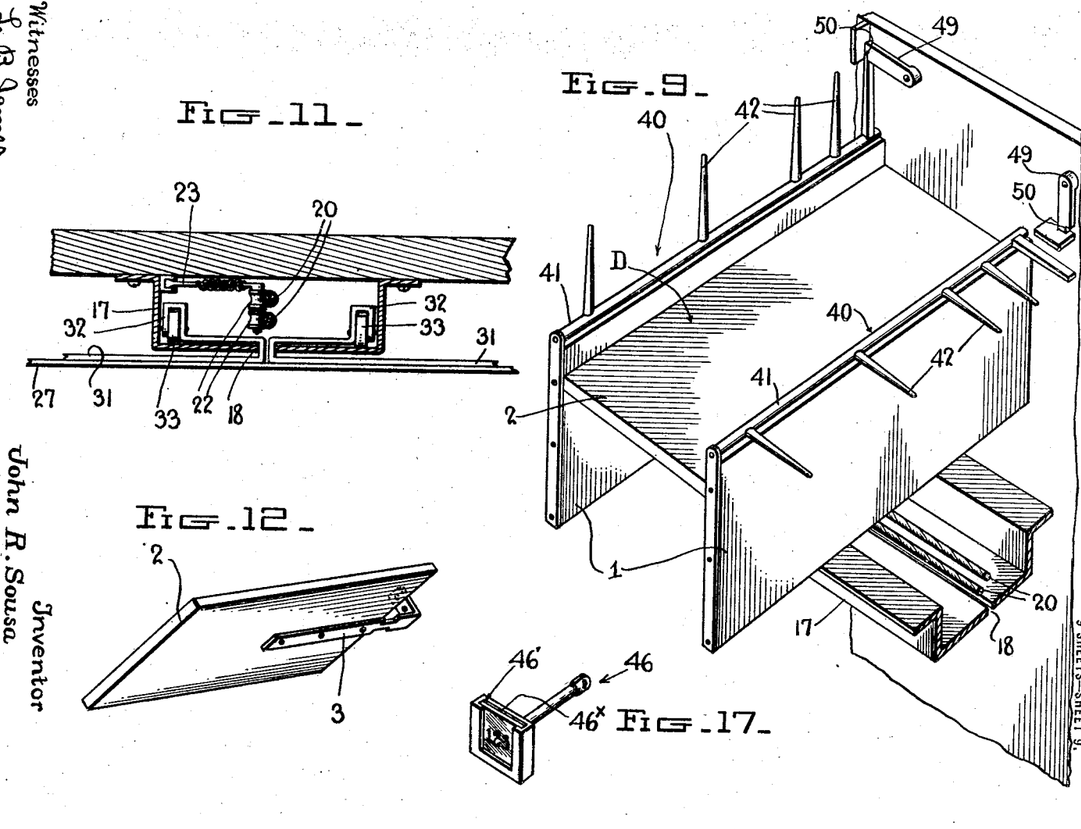
Fig. 9 is a detail perspective view of one of the receiving receptacles and a portion of the track.
Fig. 11 is a section on line 11—11 of Fig. 5.
Fig. 12 is a view showing the means of attaching the movable bottom and the receiving receptacle to its guiding member.
Fig. 17 is a view of one of the keys.
Figures 10, 16:
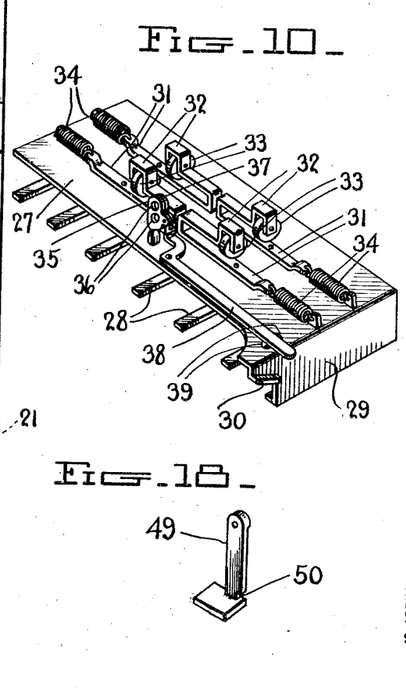
Fig. 10 is a perspective view of one of the carriages.
Fig. 16 is a sectional view of this controlling device.

The carriage is connected with the cable by means of the upright 35 which is provided with the holes 36 through which the two reaches of the cable 20 pass. The carriage also carries a clutch member 37 which is pivoted to this upright 35 and is actuated by a lever 38 so that it will engage either the upper or lower reach of the cable and thus cause the carriage to move in one direction or the other upon the track. The lever 38 extends along the base with its outer end projecting beyond the end of said base as shown in Fig. 10. The lever is normally held with the clutch in neutral position by means of the projections 39 in said base. When the lever is moved rearwardly beyond these projections the clutch grips the lower reach of the cable so that the carriage will begin its forward movement away from its starting position but when the lever is moved forwardly the top reach of the cable will be engaged by the clutch and thus the carriage will be returned to its starting position. I provide a stop X at its starting position for moving the lever into its neutral position. The object of pivoting the roller arms to the carriage and using the springs for holding them in parallel position is to facilitate the passage of the carriage around the corners of the track. As the upright 35 and the clutch strike the supporting rollers 22 these rollers will swing outwardly due to their spring controlled arms moving upon their pivots.

Each compartment is provided with a rake device 40 which is pivotally mounted on the upper edge of the partition 1. This device consists of a bar 41 provided with the arms or teeth 42. These arms or teeth are intended to pass between the fingers 28 of the carriage when said fingers are in raised position so as to remove the articles from said fingers. As before stated the partitions have their ends projecting through slots formed in the walls of the sections and one end of each rake device extends through this slot and this extended end is provided with an arm 43 and this arm is connected with the dog 10 by means of the cable 44 which passes through the guide 45. Thus the spring 14 tends to hold the rake device in its lower position with its fingers extending over the receptacle. In this way when the arm is raised by the raising of the rake device the dog will be moved inwardly upon its pivot and against the tension of the spring so that its lower tooth 13 will be moved from under the rack tooth of the guide member and the next tooth of the rack will be caught by the upper tooth 12 of said dog. In this movement the guiding member will drop a distance equal to half the distance between two of the rack teeth. When the rake device is released the spring 14 will return the dog to its normal position so that the rack teeth and the guiding member will drop from the upper tooth 12 upon the lower tooth 13 so that in the two movements of the dog the guiding member and the bottom of the receptacle will move a distance equal to the space between two of the rack teeth.

The means for raising the rake device consists of keys 46 placed on the keyboard and connected by suitable cables 47 and rocker arms 48 with the arms 43 of the rake device. These cables and rocker arms are so arranged that when the key is pressed inwardly by the finger the arm will be pulled upwardly and thus the bar 41 turned on its pivots to swing the fingers 42 into vertical position. As before described this movement of the rake device will move the dog 10 and place tension upon the spring 14, so that this spring tends to return the parts to their normal positions. As the rake device swings upwardly one of its fingers will strike the offset end of a latch member 49 which is pivoted to the wall of the section and has a notch 50 therein with which the end of the finger will engage. In this way the latch member will hold the rake device in raised position so that when the carriage reaches this point the fingers of the rake will pass between the fingers of the carriage and remove therefrom the articles previously placed upon the carriage. These articles will drop upon the bottom 2 of the receptacle and as this bottom is immediately below the fingers of the carriage the articles will have but a little way to drop so that they will remain in their original shape and position. As the carriage proceeds the end of the clutch lever 38 will strike the offset end of the member 49 and thus the lever will be shifted to connect the clutch with the other reach of the endless cable so that the carriage will travel in the other direction and return to its starting point. It will be understood that before striking the member 49 the lever 38 is in its forward position and after coming in contact with said member 49, said lever must pass from its forward position into neutral and from neutral into its rearward position before the carriage will start on its return journey and just before the lever reaches its rearward position the cam 30 will strike the offset end of the latch member and raise the same so as to release the rake device. As this is done the spring 14 will cause the rake and dog to return to their normal positions. As before stated, as the dog returns to its normal position it will permit the guiding member to move downwardly a step to lower the bottom of the receptacle to make room for another article.

As will be seen the fingers of the rake device are spaced apart varying distances so that the small articles may be placed on that part of the carriage where the fingers are placed close together while the large articles may be placed at the other end of the carriage so as to be engaged by the rake fingers which are spaced farther apart.

It will of course be understood that one set of keys upon the keyboard will control the delivery of the articles to the compartments in one section while the other keys will control the delivery of the articles to the other sections. Each section is entirely independent of the other section. The drawing shows each section provided with four rows of receiving compartments with a carriage for each row.

The operator stands in front of the keyboard and the carriages, in their starting positions, are adjacent the keyboard. If the device is used for assorting laundry each key would have thereon the laundry mark of one of the laundry customers. When the assorter comes across an article of laundry belonging to this customer he places it in the carriage which travels along the row in which the compartment of said customer is located. The assorter would then press the key containing the customer's number so as to raise the rake device in the proper compartment and move the dog inwardly, permitting the bottom of the compartment to move downward slightly. He would then move the clutch lever to connect the carriage with the endless cable. This would cause the carriage to move around the track until it struck that compartment in which the rake device is raised. Said rake would remove the article from the carriage into the compartment and the parts would return to their normal position and the carriage to its starting point. In the meantime the assorter could be placing other articles in other carriages as he does not have to await the return of the first carriage unless he has articles to be delivered in the same row. After the articles are all assorted they can be removed from their compartments and wrapped. After they are removed it is simply necessary to seize the guiding members and raise them to their highest position. The device is then ready to receive a new batch of articles.

While the device is more particularly designed for articles of laundry it will of course be understood that I do not wish to be limited in this respect.

I show a form of key in Fig. 13 in which the head is provided with a channel 46' for receiving a marker 46$^x$. In this way one marker may be removed and another inserted very easily. It will of course be understood that I do not wish to be limited to any form of key.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A distributing machine comprising a plurality of receiving compartments, means for conveying articles thereto including a carriage, key controlled means for transferring the articles from the carriage to any desired compartment and automatic means for stopping the carriage at the compartment and returning it to its starting point.

2. A device of the class described comprising a plurality of receiving compartments, means for conveying articles thereto including a carriage, a movable bottom for each compartment, key controlled means for transferring the article from the carriage to the compartment, means associated with the said means for moving the bottom a step downwardly and automatic means for returning the carriage to its starting point.

3. A distributing machine comprising a plurality of receiving compartments arranged in rows, means associated with each row for conveying articles to the compartments, said means including a carriage, means connected with each compartment for transferring the articles from the carriage to the compartments, keys for moving such means into operative position and automatic means associated with transferring means for returning the carriages to their starting point from the compartments to which the articles have been transferred.

4. A distributing machine comprising a plurality of receiving compartments, movable bottoms for said compartments, ratchet mechanism for giving each bottom a step by step downward movement, a rake device connected with each compartment, keys connected with each rake device and with the ratchet mechanism, means for conveying articles to the compartments including a carriage, supporting fingers on said carriage between which the rake device will pass to remove the articles from the carriage and cause them to drop into the compartment and automatic means for returning the carriage to its starting point.

5. A distributing machine comprising a plurality of receiving compartments, movable bottoms for said compartments, a guiding member connected with each bottom, ratchet mechanism associated with the guiding member, for giving the bottom a step by step downward movement, a rake device connected with each compartment, means for connecting said device with the ratchet mechanism, means for conveying articles to the compartments including a carriage, key means for raising the rake device to cause it to transfer the article on the carriage to the compartment and operate the ratchet mechanism to lower the bottom of the compartment and means for returning the carriage to its starting point.

6. A distributing machine comprising a plurality of receiving compartments arranged in rows, a track associated with each row, an endless cable associated with each track, a carriage located on each track, clutch mechanism for connecting the carriage with either the upper or lower runs of the cable, key operated means for transferring articles from the carriage to the compartments and means associated therewith for actuating the clutch mechanism to cause it to grip the return run of the cable and thus return the carriage to its starting point.

7. A distributing machine comprising a plurality of receiving compartments, a track associated with the compartment, a carriage engaging the track, an endless cable associated with the track, clutch mechanism on the carriage for gripping either the upper or lower runs of the cable, transferring means at each compartment for transferring articles from the carriage to said compartment, means associated therewith for actuating the clutch mechanism to cause it to grip the return run of the cable to cause the carriage to return to its starting point and means on the carriage for rendering the transferring means inoperative.

8. A distributing machine comprising a plurality of receiving compartments, means for transferring articles to said compartments including a carriage, spaced supporting fingers on the carriage, transferring means at each compartment for transferring the articles from the carriage into the compartments, said transferring means comprising a pivotally mounted bar and fingers thereon for passing between the fingers of the carriage, keys for moving the transferring means into operative position and means associated with the transferring means for returning the carriage to its starting point from the compartments to which the articles have been transferred.

9. A distributing machine comprising a plurality of receiving compartments, a track associated therewith, said track having a slot therein, a carriage engaging the track, a plurality of U-shaped arms pivoted to the carriage, said arms having their cross-pieces passed through the slot in the track, rollers carried by the arms and engaging the track, springs normally holding the arms in parallel relation, propelling means for the carriage and means for transferring articles from the carriage to the desired compartment.

10. A distributing apparatus comprising a plurality of receiving compartments, means for conveying articles to said compartments including a carriage, a transferring device for each compartment for transferring the articles from the carriage to said compartment, a latch member for holding said transferring device in operative position, a cam on the carriage for releasing said latch member and automatic means for returning the carriage to its starting point including a member adapted to be actuated by striking the said latching member.

In testimony whereof I affix my signature.

JOHN R. SOUSA.